United States Patent
Ito et al.

(10) Patent No.: US 12,006,242 B2
(45) Date of Patent: Jun. 11, 2024

(54) OPAQUE QUARTZ GLASS AND METHOD OF MANUFACTURING THE SAME

(71) Applicant: Tosoh Quartz Corporation, Yamagata (JP)

(72) Inventors: Chiemi Ito, Yamagata (JP); Takeshi Mutou, Yamagata (JP); Minoru Kuniyoshi, Yamagata (JP); Mutsumi Asano, Yamagata (JP); Atsushi Ando, Yamagata (JP)

(73) Assignee: TOSOH QUARTZ CORPORATION, Yamagata (JP)

( * ) Notice: Subject to any disclaimer, the term of this patent is extended or adjusted under 35 U.S.C. 154(b) by 259 days.

(21) Appl. No.: 17/594,885

(22) PCT Filed: Jun. 3, 2019

(86) PCT No.: PCT/JP2019/021975
§ 371 (c)(1),
(2) Date: Nov. 2, 2021

(87) PCT Pub. No.: WO2020/245874
PCT Pub. Date: Dec. 10, 2020

(65) Prior Publication Data
US 2022/0250962 A1      Aug. 11, 2022

(51) Int. Cl.
| | | |
|---|---|---|
| B32B 27/02 | (2006.01) | |
| B02C 17/20 | (2006.01) | |
| C03B 19/06 | (2006.01) | |
| C03B 19/10 | (2006.01) | |

(52) U.S. Cl.
CPC ............ *C03B 19/066* (2013.01); *B02C 17/20* (2013.01); *C03B 19/1005* (2013.01); *C03B 2201/02* (2013.01)

(58) Field of Classification Search
CPC .......... G06F 2209/5018; G06F 9/5027; G06F 9/5055; G06F 17/40; Y10S 707/99944; Y10S 707/99945; Y10S 707/99948; B02C 17/20; C03B 19/066; C03B 19/1005; C03B 2201/02; C03B 19/10; Y02P 40/57
See application file for complete search history.

(56) References Cited

U.S. PATENT DOCUMENTS

| | | |
|---|---|---|
| 2010/0316858 A1 | 12/2010 | Sato et al. |
| 2017/0341968 A1 | 11/2017 | Schenk et al. |

FOREIGN PATENT DOCUMENTS

| | | |
|---|---|---|
| JP | 3043032 B2 | 3/1992 |
| JP | 3394323 B2 | 12/1995 |
| JP | 2014-91634 A | 5/2014 |
| JP | 2017-210403 A | 11/2017 |
| WO | 2008/069194 A1 | 6/2008 |

OTHER PUBLICATIONS

International Search Report, with English translation, issued in corresponding International Application No. PCT/JP2019/021975, date of mailing Aug. 27, 2019 (5 pages).

Written Opinion of the International Searching Authority, with English translation, issued in corresponding International Application No. PCT/JP2019/021975, date of mailing Aug. 27, 2019 (6 pages).

*Primary Examiner* — Lawrence D Ferguson
(74) *Attorney, Agent, or Firm* — FLYNN THIEL, P.C.

(57) ABSTRACT

A large sized opaque quartz glass ingot having an excellent heat ray shielding property, an outstanding light blocking property, high mechanical strength and small roughness of a baked finished smooth surface.

The shape of bubbles inside the quartz glass are almost complete spheres and the average particle size of the bubbles is 1 μm or less, such that the strength of the opaque quartz glass ingot is increased as the stress concentration at the edges of the bubbles is eliminated and an increase of surface roughness caused by baking is alleviated.

5 Claims, No Drawings

OPAQUE QUARTZ GLASS AND METHOD OF MANUFACTURING THE SAME

TECHNICAL FIELD OF THE INVENTION

The present invention relates to an opaque quartz glass having high quality of heat ray blocking property and light blocking property and a method of manufacturing the same. More specifically, the present invention relates to an opaque quartz glass ingot that can be widely applicable to members of semiconductor manufacturing apparatus, components for optical instruments or the like and a manufacturing method thereof.

BACKGROUND TECHNOLOGY

Quartz glass is used for various purposes such as lighting equipment, optical equipment parts, semiconductor industrial parts, and physics and chemistry equipment because it has excellent translucency, heat resistance, and chemical resistance. Among them, opaque quartz glass containing bubbles inside the quartz glass has been used for flanges and core tubes of semiconductor heat treatment equipment because of its excellent heat ray blocking property. Further, since it has excellent light-shielding properties, it is also used as an optical device component such as a reflector base material for a light source lamp of a projector.

The opaque quartz glass is made to be whitened by generating bubbles inside thereof. The shape of these bubbles is roughly classified as an amorphous or non-spherical one and a spherical one depending on the manufacturing methods. According to the amorphous bubble manufacturing method, it is easy to reduce the average particle size of the bubbles and the baked surface of the obtained opaque quartz glass has excellent smoothness but when the obtained opaque quartz glass is sintered until the bubbles are almost closed the density of the existing bubbles becomes small. Consequently, there occurs a problem that the whiteness and the reflectance of infrared rays of the opaque quartz glass are lowered, and further, there is a problem that stress is concentrated on the edge of the bubble and the mechanical strength of the opaque quartz glass becomes low.

Opaque quartz glass composed of complete spherical bubbles has excellent mechanical strength because the bubbles have no edges and the stress does not concentrate to the edges of the bubbles. However, it is difficult to reduce the diameters of the producing bubbles which make the quartz glass opaque and further the baked finished surface of the opaque quartz glass becomes rough and uneven. And when the opaque quartz glass is used as a flange of the device, a contact face with the device is not complete and causes leakage. Further, when the opaque quartz glass is applied to a reflector base material, the light of the lamp may leak, which may adversely affect the electronic components inside the projector.

Among the manufacturing methods of opaque quartz glass ingot in which bubbles are amorphous (non-spherical), a molded body of amorphous silica powder is heated at a temperature equal to or lower than its melting temperature, then the heat treatment is interrupted before it is completely densified and partially fired, which is disclosed in Patent Document 1 (JP Patent No. 3394323). This manufacturing method is not preferable because according to this method, it is difficult to obtain a large sized ingot and the possible size of the opaque quartz glass is limited.

As a method of manufacturing opaque quartz glass ingot having spherical shape bubbles, a method in which a foaming agent such as silicon nitride is added to crystalline silica or amorphous silica and heated and melted by oxyhydrogen flame is disclosed in Patent Document 2 (JP Patent No. 3043032). According to this manufacturing method, a large sized opaque quartz glass ingot can be obtained.

PRIOR ART DOCUMENT

Patent Documents

[Patent Document 1] Japanese Patent No. 3394323
[Patent Document 2] Japanese Patent No. 3043032

DISCLOSURE OF INVENTION

Problems to be Solved by the Invention

The present invention is based on a finding that heat ray blocking property, light shielding property and mechanical strength and roughness of the baked surface of a large sized opaque glass ingot is closely related to the mean diameter of the bubbles existing therein. And the invention provides an opaque quartz glass having superior properties mentioned above, utilizing the average diameter of the bubbles as a parameter index for obtaining opaque quartz glass having above mentioned desirable properties.

Means for Solving the Problems

The present invention is an opaque quartz glass having bubbles of which the mean diameter is controlled to be less than 1 μm, stress concentration at the ends of the bubbles being prevented and consequently the strength of the opaque quartz glass material is increased. And an increase of the surface roughness caused by the baking process of the quartz glass ingot is prevented. The density of the product is 2.16 to 2.19 g/cm$^3$, the whiteness at thickness of 10 mm is 90% or more, the light reflectance at a wavelength of 0.2 to 3 μm at a thickness of 3 mm is 85% or more, the bending strength is 75 MPa or more, and the surface roughness Ra is 0.5 μm or less. Further, the present invention is a manufacturing method of the opaque quartz glass ingot wherein a silica powder slurry having silica powder concentration of 45 to 75 wt % is subjected to wet pulverization by applying one or a combination of two or more methods selected from beads mill pulverization, ball mill pulverization, vibration mill pulverization and attritor pulverization, and then the slurry is subjected to spray dry granulation for forming substantially spherical granulated silica particles having mean particle diameter of 2 to 8 μm, a standard deviation of the particle size of the pulverized powder of 3 to 7 μm and the BET specific area of 2 to 9 m$^2$/g, and the prepared slurry is subjected to spray drying to obtain granulated silica particles and the granulated silica particles are press-molded and fired.

The mean diameter of the bubbles of the obtained opaque quartz glass ingot is determined as follows.

First cutting the opaque quartz glass ingot for obtaining a specimen, then observing 20 or more bubbles appearing on the cut surface of the specimen is observed with a desktop scanning electron microscope for obtaining images of the bubbles appearing on the surface, processing the images of the bubbles to obtain the cross-sectional area "A" of each bubble, and calculating the mean value of the value "D" according to the following formula (1).

$$D = (4 \times A/\pi)^{1/2} \qquad (1)$$

A scanning electron microscope used for measuring the cross-sectional area "A" is TM4000 Plus made by Hitachi, Ltd.

The whiteness of the opaque quartz glass is measured as the brightness in accordance with JIS Z 8722 (Japanese Industrial Standard) and the measuring instrument is a color difference meter (CR-400) manufactured by Konica Minolta.

The opaque quartz glass of the present invention is manufactured as follows. Preparing silica powder slurry in which silica powder is dispersed in water, then the slurry is wet-ground to obtain mean particle size of the pulverized silica powder of 2 to 8 μm, standard deviation of the particle size of 3 to 7 μm, and the BET specific area of 2 to 9 $m^2/g$, and the slurry is subjected to spray drying to obtain granulated silica particles and the granulated silica particles are press-molded and fired.

The features of the opaque quartz glass of the present invention are as follows.

It is essential that the mean diameter of the bubbles should be 1 μm or less. If the bubble mean diameter is larger than 1 μm, the whiteness of the opaque quartz glass becomes low and the bending strength is insufficient. In addition, the surface roughness of the baked finished surface becomes larger.

The density of the opaque quartz glass is preferably in the range of 2.16 to 2.19 $g/cm^3$. If the density is less than 2.16 $g/cm^3$, the bending strength is lowered and insufficient, and if the density exceeds 2.19 $g/cm^3$, the whiteness and the reflectance of the opaque quartz glass are lowered which is not preferable.

The method for manufacturing the opaque quartz glass of the present invention is described in more detail below.

The method for manufacturing opaque quartz glass of the present invention, when slurry of silica powder dispersed in water is wet-pulverized, the average particle size of the pulverized powder is 2 to 8 μm or less, and the standard deviation of the particle size of the pulverized powder is 3 to 3. It is 7 μm and has a BET specific surface area of 2 to 9 $m^2/g$.

Further, the opaque quartz glass of the present invention is obtained by melting the granulated powder obtained by subjecting the slurry to spray-dry granulation.

Hereinafter, each step will be described more in detail. As can be said for all through the processes, it is necessary to sufficiently select the equipment to be used so that impurity contamination does not occur during the process. The metal impurities should be strictly avoided so that the content of the metal impurities in the opaque quartz glass of the final product is less than 1 ppm each.

(1) Selection of Raw Material of Silica Powder

The production method of the silica powder is not particularly limited, and for example, an amorphous silica powder produced by hydrolyzing silicon alkoxide, a silica powder produced by hydrolyzing silicon tetrachloride with a hydrogen acid flame or the like can be applicable.

In addition, silica powder produced by pulverizing natural quartz or fumed silica can also be used.

The average particle size of the silica powder is preferably 100 μm or less, and more preferably 60 μm or less. If the average particle size exceeds 300 μm, it takes a long time for wet pulverization of the silica powder, which lowers the productivity and increases the production cost, which is not preferable.

(2) Slurry Preparation

The concentration of the silica powder slurry in which the silica powder is dispersed in water is 45 to 75 wt %, preferably 60 to 70 wt %. If it exceeds 75 wt %, the viscosity of the slurry becomes high and wet pulverization cannot be performed. Further, if the concentration is less than 45 wt %, the amount of water becomes too large and it requires excess heat for drying, which is not desirable because it causes a decrease in productivity and an increase in production cost.

(3) Wet Pulverization of Slurry

The concentration controlled silica powder slurry is subjected to wet grinding using one or more different kinds of beads selected from quartz glass beads, zirconia beads, silicon carbide beads, or alumina beads having an average particle size of 0.1 mm to 3 mm. The average particle size of the pulverized silica powder contained in the slurry is 2 μm to 8 μm. If the average particle size of the pulverized silica powder is larger than 8 μm, the mean diameter of the bubbles inside the opaque quartz glass product becomes rather large. On the other hand, if the mean diameter of the silica powder is smaller than 2 μm, the viscosity of the slurry becomes high and the productivity of the opaque quartz glass ingot is lowered, which is not desirable.

The standard deviation of the particle size of the pulverized silica powder is 3 to 7 μm. If the standard deviation is larger than 7 μm, the viscosity of the slurry becomes high, which is undesirable because it lowers the productivity. If the standard deviation is less than 3 μm, the density of the obtained opaque quartz glass product becomes low.

The BET specific surface area of the pulverized powder contained in the slurry after wet pulverization is preferably 2 $m^2/g$ or more. More preferably, it is 4 $m^2/g$ or more, and it is more preferable to perform wet pulverization until it becomes 6 $m^2/g$ or more. When the BET specific surface area is smaller than 2 $m^2/g$, the strength of the granulated powder is lowered and the granulated powder collapses and the yield of productivity at the time of granulation is lowered.

If the BET specific surface area is larger than 9 $m^2/g$, the moldability in press molding process deteriorates, which is not preferable.

The method of wet pulverization of the slurry is not specifically limited, and examples thereof include beds mill pulverization, ball mill pulverization, vibration mill pulverization, and attritor pulverization, and any other means may be used. In particular, it is desirable to adapt a beads mill pulverization or a combination of a beads mill pulverization and a ball mill pulverization.

(4) Spray-Dry Granulation

Next, the prepared silica powder slurry is spray-dried to obtain granulated powder, which is substantially spherical and has an average particle size of 30 to 200 μm and a water content of 3 wt % or less.

If the average particle size of the granulated powder is less than 30 μm, the granulated powder dissipates during the press molding process and the yield deteriorates. If the average particle size exceeds 200 μm, the press molding process does not work properly. Further, when the water content exceeds 3 wt %, the fluidity of the granulated powder becomes low and the uniformity of the obtained pressed products becomes low, which is not preferable.

(5) Press Molding and Firing of Granulated Silica Powder

An opaque quartz glass ingot can be obtained by press-molding. The obtained granulated silica powder is molded into an arbitrary shape and is subjected to firing. Press pressure of the press molding is preferably 10 to 300 MPa. If it is less than 10 MPa, the molded product will easily collapse and the yield of the molding process becomes low. If the press pressure is larger than 300 MPa, a large-scale facility is required, which may lead to decreasing the productivity and increasing the production cost, which is not preferable.

The obtained molded product is baked by combining one or more types selected from atmospheric baking and vacuum baking, or the combination of the atmospheric baking. And the maximum baking temperature is from 1300° C. to 1500° C., preferably from 1350° C. to 1450° C., and more preferably from 1380° C. to 1430° C.

When the baking temperature is too high, the whiteness and reflectance properties will become low, while when the baking temperature is low, the density and bending strength of the opaque quartz glass product will decrease.

Opaque quartz glass ingot manufactured by the above mentioned process is machined to obtain desired products using machining machines, such as band saws, wire saws, or core drills.

(6) Purity of the Obtained Opaque Quartz Glass

The purity of the obtained opaque quartz glass can be controlled by selecting the quality of the silica powder used as the raw material. Except for the constituent elements of the beads used in the pulverization media, and the purity of the product is almost the same as that of the raw material silica powder.

Advantages of the Invention

The opaque quartz glass ingot of the present invention has excellent properties of heat ray blocking property and light blocking property, and is particularly applicable for various core tubes, jigs and containers such as bell jars used in the semiconductor manufacturing process industry field, for example, for processing silicon wafers. It can also be suitably used as a constituent material for a core tube, a flange, a heat insulating fin, a crucible for melting silicon, and the like. It can also be used as a reflector base material of a light source lamp of a projector as an optical device component.

BEST MODE FOR CARRYING OUT THE INVENTION

Hereinafter, the present invention is specifically described with reference to examples, but the present invention is not limited to the examples.

A desktop scanning electron microscope is used for measuring instrument of average particle size of bubble, which is "TM4000 Plus" manufactured by Hitachi, Ltd., and a color difference meter used to measure whiteness, is "CR-400" manufactured by Konica Minolta.

EXAMPLES 1~3

A slurry in which silica powder is dispersed in water at concentration of 45 to 75 wt % is subjected to wet pulverization selected from one or a combination of two or more methods selected from the beads mill pulverization, ball mill pulverization, vibration mill pulverization or attritor pulverization so as to obtain an average particle size of 2~8 μm, a standard deviation of the particle size of the pulverized powder of 3~7 μm, and a BET specific surface area of solids contained in the slurry of 2~9 m$^2$/g.

Spray dry granulation is conducted to obtain silica powder having an average particle size of 30 to 200 μm and water content of 3 wt % or less, and the granulated silica powder is press-molded and fired to obtain an opaque quartz glass ingot.

The characteristics of the obtained opaque quartz glass are shown in Table 1. The average diameter of the bubbles of the opaque quartz glass is 1 μm or less, the density is 2.16~2.19 g/cm$^3$, the whiteness at thickness of 10 mm is 90% or more, and the reflectance of light wave length of 0.2~3 μm is 85% or more, the bending strength is 75 MPa or more, and the surface roughness Ra of the baked surface is 0.5 μm or less.

The weight of the obtained opaque quartz glass ingot is 70 kg, and the bubbles of the opaque quartz glass ingot are confirmed to be uniformly dispersed by visual observation, which is also aesthetically excellent.

COMPARATIVE EXAMPLE 1

A slurry in which silica powder is dispersed in water at concentration of 45 to 75 wt % is subjected to wet pulverization selected from one or a combination of two or more methods selected from the beads mill pulverization, ball mill pulverization, vibration mill pulverization or attritor pulverization so as to obtain an average particle size of 9 μm, a standard deviation of the particle size of the pulverized powder of 3~7 μm, and a BET specific surface area of solids contained in the slurry of 2~9 m$^2$/g.

Spray dry granulation is conducted to obtain silica powder having an average particle size of 30~200 μm and water content of 3 wt % or less, and the granulated silica powder is press-molded and fired to obtain an opaque quartz glass ingot having air bubbles of mean diameter of 2 μm and density of 2.16~2.19 g/cm$^3$.

The whiteness at thickness of 10 mm is 83%, which is lower than the lower limit 90% of the present invention and the reflectance of light of wavelength of 0.2 to 3 μm at thickness 3 mm is 50%, which is below the lower limit 80% of the present invention. The bending strength is 67 MPa and the surface roughness Ra of the baked surface is 1.5 μm which exceeds the upper limit of the present invention.

COMPARATIVE EXAMPLE 2

A slurry in which silica powder is dispersed in water at 45 to 75 wt % is subjected to wet pulverization to obtain an average particle size of 2~8 μm, a standard deviation of the particle size of the pulverized powder of 2 μm, and a BET specific surface area of solids contained in the slurry of to 2~9 m$^2$/g. After wet pulverization by one or a combination of two or more methods of beads mill pulverization, ball mill pulverization, vibration mill pulverization, and attritor pulverization so as, spray-dry granulation is performed and the average is substantially spherical.

Granulated powder having a particle size of 30 to 200 μm and a water content of 3 wt % or less is obtained and fired after press molding. As shown in Table 1, the measurement results show that the average particle size of the bubbles in the quartz glass is 0.9 μm and the density is 2.10 g/cm$^3$, the whiteness at a thickness of 10 mm is 92%, and the reflectance of light of wavelength of 0.2 to 3 μm at 2 mm thick is 62%, the bending strength is 65 MPa, the surface roughness Ra of the baked surface is 0.8 μm which exceeds the upper limit of 0.5 μm of the present invention, and is lack in flatness.

COMPARATIVE EXAMPLE 3

A slurry in which silica powder is dispersed in water at 45 to 75 wt % has an average particle size of 2 to 8 μm, a standard deviation of the particle size of the pulverized powder of 3 to 7 μm, and a BET specific surface area of solids contained in the slurry is 2 to 9 m²/g. After wet pulverization by one or a combination of two or more methods of beads mill pulverization, ball mill pulverization, vibration mill pulverization or attritor pulverization so as to be spray-dry granulation is performed to obtain a substantially spherical shape.

Granulated powder having an average particle size of 30 to 200 μm and a water content of 3 wt % or less was press-molded and then fired at 1510° C. for obtaining opaque quartz glass having the characteristics shown in Table 1.

The average particle size of the bubbles of the obtained opaque quartz glass is 0.8 μm, the density is 2.20 g/cm³, the bending strength is 80 MPa, the surface roughness Ra of the baked surface is 0.5 μm, and the whiteness at a thickness of 10 mm is 79. %. The reflectance of light of wavelength of 0.2 μm to 3 μm is 40% at thickness of 2 mm.

TABLE 1

| | Mean diameter of Bubble (μm) | Density (g/cm³) | Reflectance (%) | Whiteness (%) | Three point Bending strength (MPa) | Roughness of baked surface Ra (μm) | Rmax |
|---|---|---|---|---|---|---|---|
| Example 1 | 1.0 | 2.17 | 86 | 90 | 80 | 0.5 | 0.6 |
| Example 2 | 0.9 | 2.19 | 87 | 91 | 78 | 0.4 | 0.5 |
| Example 3 | 0.8 | 2.16 | 88 | 93 | 85 | 0.4 | 0.5 |
| Comparative Example 1 | 2.0 | 2.18 | 50 | 83 | 67 | 1.5 | 3.0 |
| Comparative Example 2 | 0.9 | 2.10 | 62 | 92 | 65 | 0.8 | 1.5 |
| Comparative Example 3 | 0.8 | 2.20 | 40 | 70 | 80 | 0.5 | 0.6 |

INDUSTRIAL APPLICABILITY

The opaque quartz glass ingot according to the present invention is a large sized opaque quartz glass ingot having excellent in heat ray shielding property and light blocking property and the baked surface is smooth and has property of small roughness Ra. And the opaque quartz glass is applicable in variety of industrial fields, especially applicable in the field of members of the semi-conductor manufacturing machines and optical apparatus.

The invention claimed is:

1. An opaque quartz glass wherein an average diameter of bubbles contained therein is 1 μm or less, a density is 2.16 to 2.19 g/cm³, a whiteness is 90% or more at a thickness of 10 mm, and a reflectance of light of wavelength from 0.2 to 3 μm at a thickness of 3 mm is above 85%, wherein the average diameter of the bubbles is determined by cutting a sample of the opaque quartz glass to provide a cut surface, observing at least 20 bubbles on the cut surface by using a scanning electron microscope, processing obtained images from the scanning electron microscope of the at least 20 bubbles and measuring an area "A" of each bubble wherein an average value "D" of the bubbles is determined by the following equation (1):

$$D = (4 \times A/\pi)^{1/2}. \quad (1)$$

2. The opaque quartz glass according to claim 1, wherein a bending strength of the opaque quartz glass is equal to or above 75 MPa.

3. The opaque quartz glass according to claim 1, wherein the opaque quartz glass has a baked finished surface, and a surface roughness Ra of the baked finished surface is equal to or less than 0.5 μm.

4. A method of manufacturing an opaque quartz glass, comprising the steps of:
preparing a silica powder slurry having a silica powder concentration of 45 to 75 wt %;
subjecting the silica powder slurry to wet pulverization by applying one or a combination of two or more methods selected from beads mill pulverization, ball mill pulverization, vibration mill pulverization and attritor pulverization;
subjecting the silica powder slurry to spray dry granulation for forming substantially spherical granulated silica particles each having a mean particle diameter of 2 to 8 μm, a standard deviation of the particle size of the granulated silica particles of 3 to 7 μm and a BET specific area of 2 to 9 m²/g, to make a prepared slurry;
subjecting the prepared slurry to spray drying to obtain dried granulated silica particles; and
press-molding and firing the dried granulated silica particles.

5. The method of manufacturing an opaque quartz glass according to claim 4, wherein one or more type of beads is used for the wet pulverization, the beads being selected from the group consisting of quartz glass beads, zirconia beads, silicon carbide beads and alumina beads having an average particle size of 0.1-3 mm.

* * * * *